Aug. 12, 1924.

C. BAISCH 1,504,926

ROTARY INTERNAL COMBUSTION ENGINE

Filed March 11, 1922.   3 Sheets-Sheet 1

Carroll Baisch
INVENTOR

BY Victor J. Evans
ATTORNEY

Aug. 12, 1924.
C. BAISCH
1,504,926
ROTARY INTERNAL COMBUSTION ENGINE
Filed March 11, 1922     3 Sheets-Sheet 2
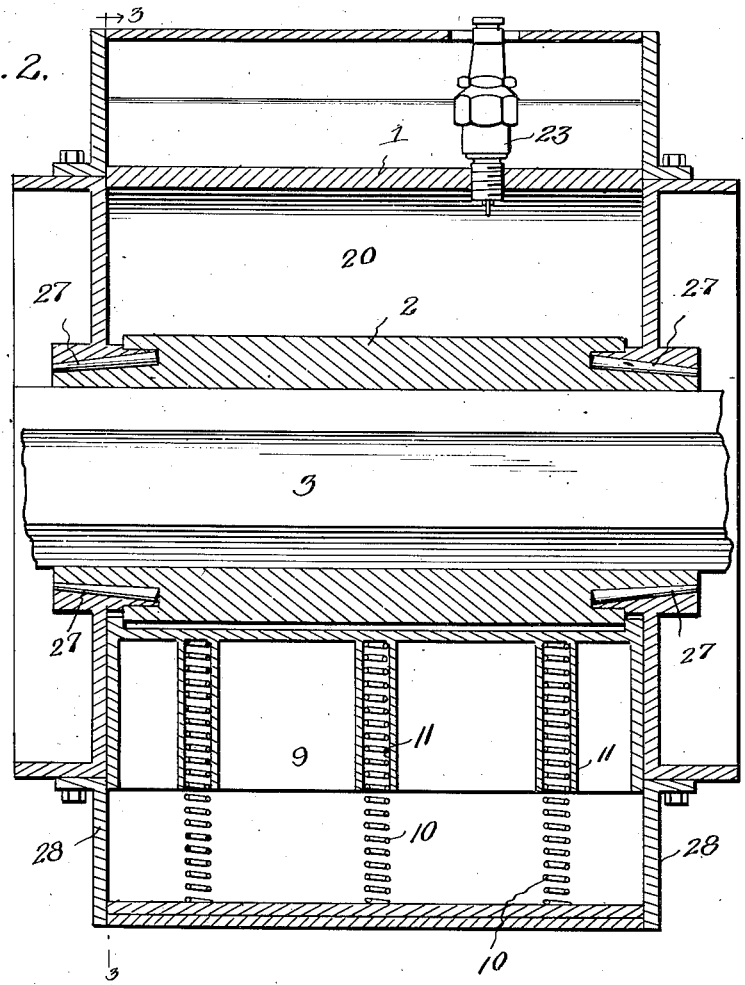
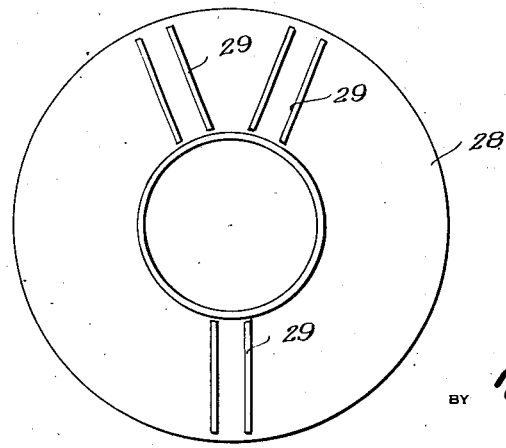
Carroll Baisch
INVENTOR
BY Victor J. Evans
ATTORNEY Aug. 12, 1924.

C. BAISCH

ROTARY INTERNAL COMBUSTION ENGINE

Filed March 11, 1922   3 Sheets-Sheet 3

Carroll Baisch
INVENTOR

BY Victor J. Evans
ATTORNEY

Patented Aug. 12, 1924.

1,504,926

UNITED STATES PATENT OFFICE.

CARROLL BAISCH, OF LINCOLN, NEBRASKA.

ROTARY INTERNAL-COMBUSTION ENGINE.

Application filed March 11, 1922. Serial No. 543,067.

*To all whom it may concern:*

Be it known that I, CARROLL BAISCH, a citizen of the United States, residing at Lincoln, in the county of Lancaster and State of Nebraska, have invented new and useful Improvements in Rotary Internal-Combustion Engines, of which the following is a specification.

This invention relates to internal combustion engines of the rotary type, and an object of the invention is to provide a rotary engine in which a minimum number of movable parts are provided, thereby reducing friction and loss power to a minimum, permitting the utilization of the maximum power of the motor developed, for work and consequently increasing the efficiency of the motor with respect to motors or engines of the reciprocating piston type.

Another object of this invention is to provide an engine as specified in which the valves are operated directly by the rotor or piston, eliminating cam shafts and the analogous mechanism usually employed for operating valves, and also an engine in which the piston operates the driving or power shaft in a leverage principle providing an engine in which the maximum power may be developed at relatively low speeds.

A further object of the invention is to provide a rotary motor or engine which is designed to be effectively cooled by air eliminating the water cooled construction and the necessary parts for effectively operating the same, and also an engine in which all of the moving parts are kept free of carbon.

Other objects of the invention will appear in the following detailed description taken in connection with the accompanying drawings wherein:

Fig. 2 is a longitudinal section through the engine.

Fig. 3 is a cross section taken on the line 3—3 of Fig 2.

Figure 5:
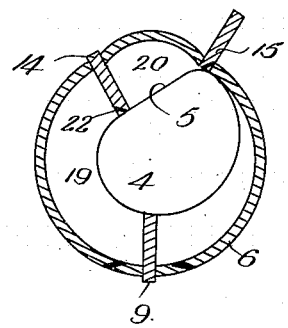
Figure 6:
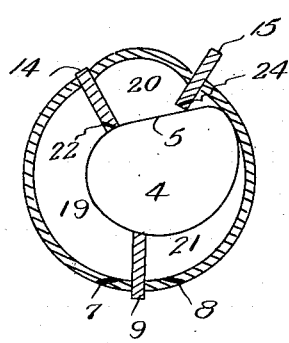
Figure 7:
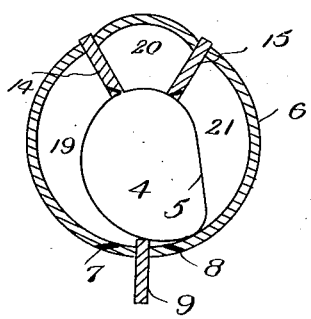
Figure 8:
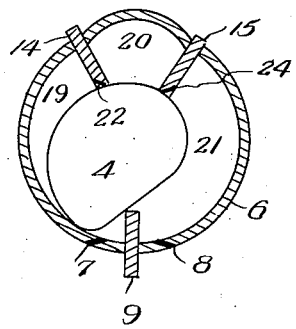
Figure 9:
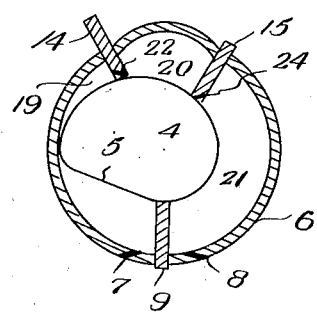

Referring more particularly to the drawings, the improved rotary internal combustion engine comprises a stator 1 and a rotor 2 rotatably mounted therein. The rotor 2 comprises the power or driving shaft 3 upon which the piston 4 is mounted. The piston 4 has its perimeter shaped irregularly or like an irregular curve providing a relatively flat surface 5 against which the exploding gases impinge for imparting rotation to the piston and consequently to the shaft 3. The piston 4 rotates within the cylinder 6 which forms a part of the stator structure 1 and has an inlet port 7 and an exhaust port 8 communicating with its interior, the said ports being separated by a sliding valvular abutment 9, the inner edge of which is urged into engagement with the perimeter of the piston 4 by spiral springs 10 which extend into suitable recesses 11 in the abutment and into the guide 12 which guides the sliding movement of the abutment, it being understood that the abutment is movably radially of the axis of rotation of the piston 4 and shaft 3 to permit its proper engagement with the irregular perimeter of the piston. Sliding valvular abutments 14 and 15 are also provided which are slidably supported by suitable guides 16 and 17 respectively and which are urged into engagement with the perimeter of the piston 4 by suitable spiral springs 18. The abutments 9, 14 and 15 divide the interior of the cylinder 6 into an inlet and compression chamber 19, an explosion chamber 20 and an exhaust chamber 21, the chambers 19 and 21 have communication with the inlet and exhaust openings 7 and 8 respectively. In operation, the volatile or combustible fuel enters the compartment 19 during the interval when the piston 4 is positioned as shown in the diagrammatic Fig. 7 and the continued rotation of the piston to the left in Fig. 7 will compress the gases in the chamber 19 and also force the abutment 14 outwardly so that the diagonal opening 22 therein will be open as shown in the diagrammatic Figs. 8 and 9 permitting the compressed gas or fuel to be forced and further compressed in the chamber 20 where it is confined until the piston 4 proceeds further in its revolution and closes communication between the chambers 19 and 20 by closing the diagonal opening 22 as shown in Fig. 5 of the drawings. At this time the abutment 15 is forced outwardly at its maximum distance from the axis of the rotor, and the flat surface 5 of the piston is positioned across the chamber 20. When the respective abutments and the piston are in such position, the compressed charge of fuel in the chamber 20 is exploded by means of approved type of spark plugs as indicated at 23 and the force of the explosion impinging against the flat surface 5 will force the piston 4 about within the cylinder 6 moving the flat surface 5 away from the chamber 20 and permitting communication between the chambers 20 and 21 through the diagonal opening 24 in the abutment 15 which communication is permitted by the engagement of the perimeter of the piston 4 with the inner corner of the abutment 15 farthest from the chamber 20 as clearly shown in Fig. 6 of the drawings.

Figure 1:
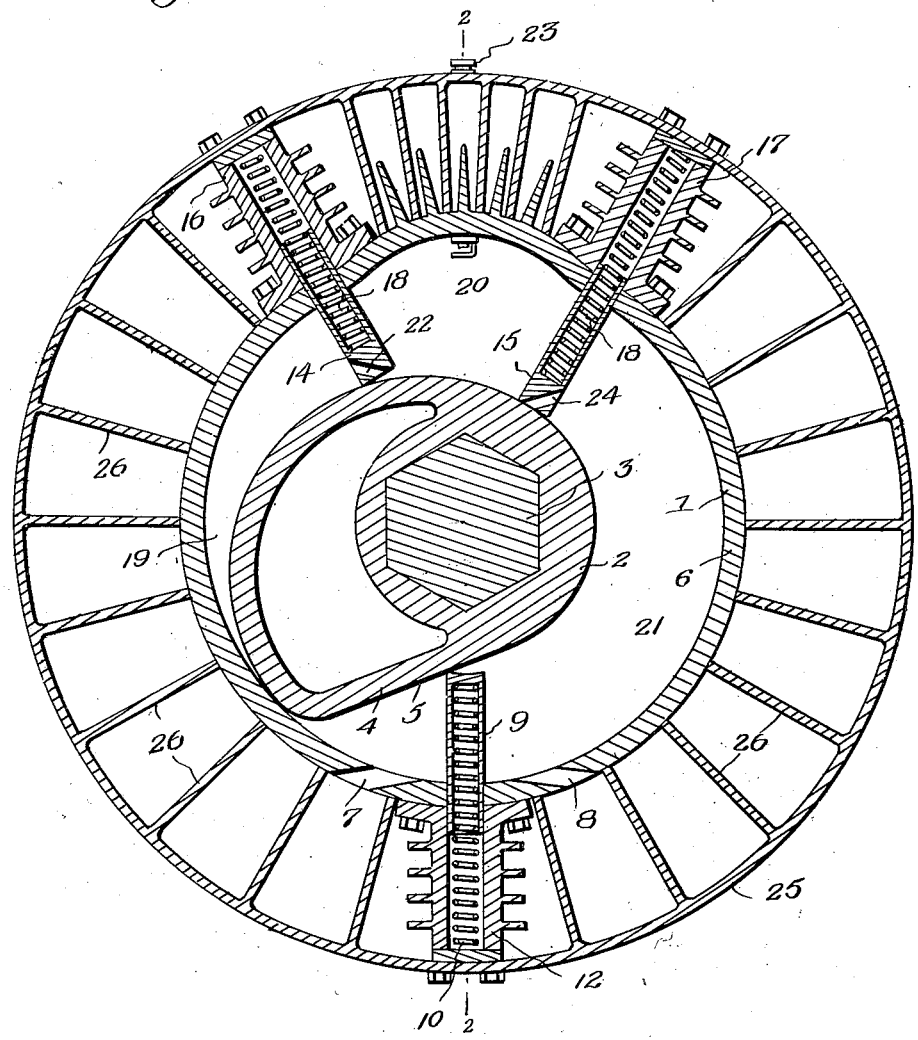
Fig. 1 is a cross section through the improved rotary engine taken on the line 1—1 of Fig. 2.
Figure 4:
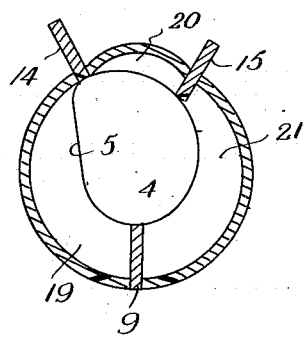
Figs. 4, 5, 6, 7, 8 and 9 are diagrammatic views illustrating the different positions of the piston or phases in the operation of the engine.

It is understood, of course, that the abutments 9, 14 and 15 are held against rocking movement by their respective guides so that the irregularity in the perimeter of the piston will alternately open and close the respective passageways or openings 22 and 24 in the abutments 14 and 15 to permit communication between the respective compartments at the proper time. The burnt gases passing from the chamber 20 into the chamber 21 follow the flat surface 5 of the surfaces about until they exhaust through the opening 8. During this exhausting of burnt gases a new charge of gas is entering the chamber 19 which charge is compressed by the piston 4 and reaches its highest state of compression when the piston 4 is in the position as shown in Fig. 4 of the drawings, that is just before the flat surface 5 enters the chamber 20.

It will be noted by reference to Figs 1 and 4 to 9 inclusive of the drawings that the cylinder 6 is bulged outwardly at the chamber 20 to permit clearance of the piston and the spark plugs 23 and also to provide sufficient space for the gases during compression movement of the piston through the compartment 20.

A casing 25 is mounted about the cylinder 6 and it is provided with a plurality of ribs or fins 26 radiating from the axis of the piston 4 and extending longitudinally of the engine structure, the said fins cooperating for cooling the engine, the spaces between the fins being open at the ends of the engine to permit air to pass longitudinally through the shell or casing 25 between the fins for cooling them and diffusing the heat absorbed by the fins from the cylinder 6 in their radiation. Suitable roller bearings as indicated at 27 may be provided for relieving friction of the rotating parts.

In Fig. 3 of the drawings, the end plates 28 of the engine structure are illustrated, showing the guiding recesses 29 therein for the respective valves 9, 14 and 15.

It is, of course, to be understood that the invention may be constructed in other manners and the parts associated in other relations and, therefore, I do not desire to be limited in any manner except as set forth in the claims hereunto appended.

Having thus described my invention what I claim is:

1. In a rotary internal combustion engine, a stationary cylinder, a piston rotatable therein, a plurality of sliding abutments extending into the cylinder and dividing into inlet compression and exhaust compartments, said piston having an irregular perimeter, means urging said abutments in engagement with the perimeter of the piston to permit operation of the abutments by rotation of the piston to control the passage of gases into and from said compartments, certain of said valves provided with diagonal openings adapted to be normally closed by the perimeter of said piston, and at predetermined times free from engagement with the perimenter of the piston to permit the passage of gases therethrough.

2. In a rotary internal combustion engine, a stationary cylinder, a piston rotatable therein, a plurality of sliding abutments extending into the cylinder and dividing into inlet compression and exhaust compartments, said piston having an irregular perimeter, means urging said abutments in engagement with the perimeter of the piston to permit operation of the abutments by rotation of the piston to control the passage of gas into and from said compartment, certain of said abutments provided with diagonal openings adapted to be normally closed by the perimeter of said piston, and at predetermined times free from engagement with the perimeter of the piston to permit the passage of gas therethrough, said piston provided with a flat portion on its perimeter.

3. In a rotary internal combustion engine, a stationary cylinder, a piston rotatable therein, a plurality of sliding abutments extending into the cylinder and dividing into inlet compression and exhaust compartments, said piston having an irregular perimeter, means urging said abutments in engagement with the perimeter of the piston to permit operation of the abutments by rotation of the piston to control the passage of gas into and from said compartments, certain of said abutments provided with diagonal openings adapted to be normally closed by said piston, and at predetermined times free from engagement with the perimeter of the piston to permit the passage of gas therethrough, said piston provided with a flat portion on its perimeter, a casing surrounding said cylinder, a plurality of radiating fins in said casing and engaging said cylinder permitting radiation of heat from the cylinder, said casing being open at its ends to permit longitudinal passage of air therethrough for engagement with said fins, said cylinder having its perimeter bulged outwardly between two of said abutments to provide an explosion space, and radiating fins formed on the outer perimeter of the stator at said bulged portion and located between said first named fins.

4. In a rotary engine a stator, a piston rotatable therein having an irregular shaped perimeter, a plurality of slidable abutments engaging the perimeter of the piston provided with diagonal openings adapted to be normally closed through their engagement with the irregular perimeter of said piston and at certain intervals be free from engagement with the piston to permit gas to pass therethrough.

In testimony whereof I affix my signature.

CARROLL BAISCH.